Aug. 19, 1969 J. HAMILTON-FEY 3,462,549
DATA TRANSMISSION SYSTEMS
Filed Nov. 15, 1966
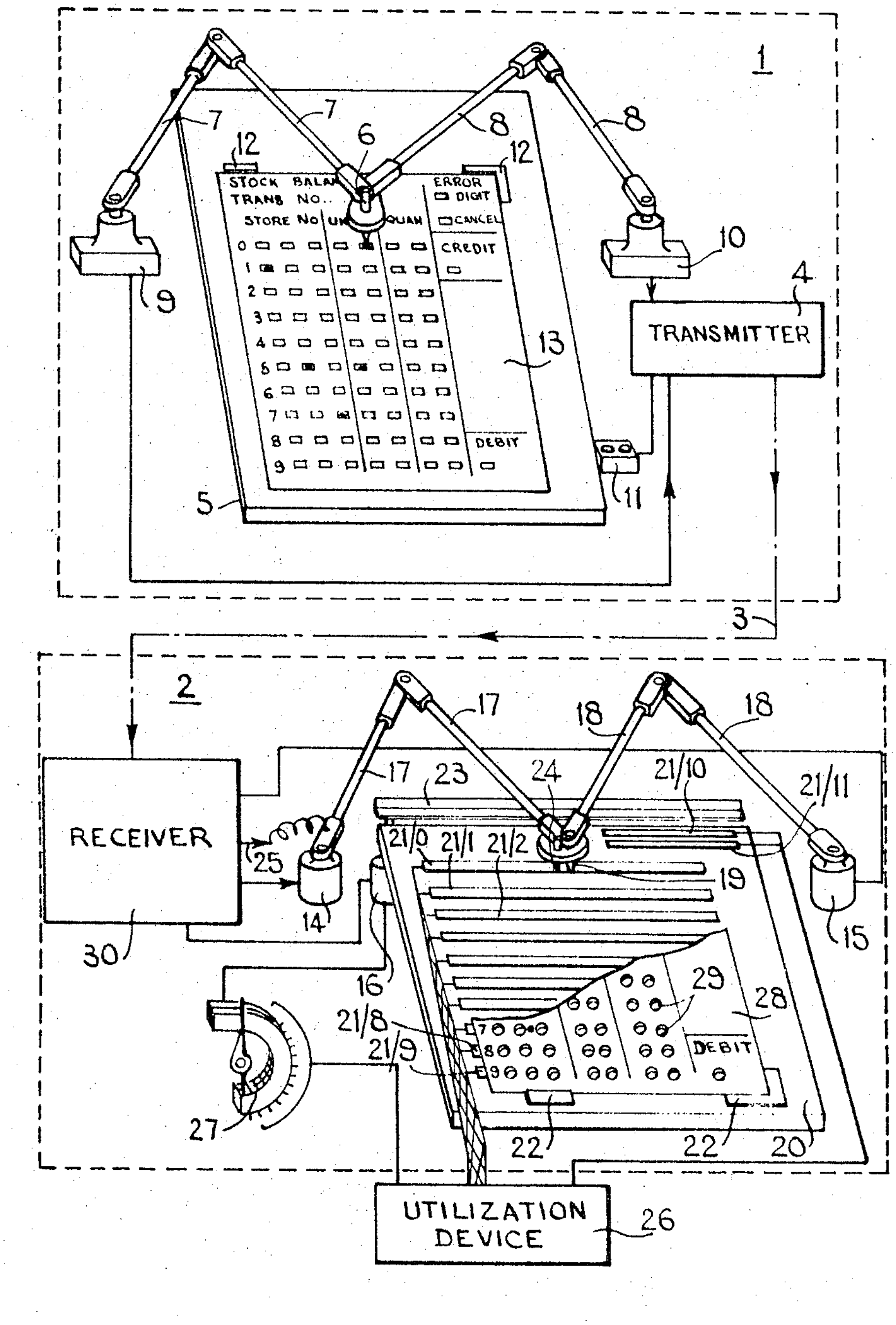
INVENTOR
John Hamilton-Fey
BY Hane and Nydick
ATTORNEY United States Patent Office 3,462,549

Patented Aug. 19, 1969

3,462,549

DATA TRANSMISSON SYSTEMS

John Hamilton-Fey, Letchworth, England, assignor to International Computers and Tabulators Limited, Putney, London, England, a British company Filed Nov. 15, 1966, Ser. No. 594,622

Claims priority, application Great Britain, Dec. 7, 1965, 51,757/65

Int. Cl. H04l *15/08;* G08b *5/00*

U.S. Cl. 178—18 9 Claims

ABSTRACT OF THE DISCLOSURE

A data transmission system is described in which sensing of digital data is caused to produce electrical analog signals, the analog signals being transmitted to a receiving station and there converted back to digital signal corresponding to the original data.

This invention relates to data transmission systems.

It is well known to couple a manually operated input device to a computer by means of a data transmission link. The input device may be a keyboard, or a set of push buttons, or dials, for example. Data to be transmitted is set manually on the input device, which generates a corresponding coded group of pulses for transmission. The data may be encoded in binary, teleprinter, or other suitable code. The encoded data may be transmitted over land-line or radio link to a receiving unit. The receiving unit couples the transmission link to the computer, providing buffering and re-synchronising facilities. It may also include code conversion facilities. The link may be two-way, so that data from the computer can be displayed at the remote input point.

A data link of this kind is particularly suitable for providing relatively sophisticated remote input and/or output facilities. However, the use of pulse coding techniques requires a substantial transmission bandwidth and the input and receiving units are fairly expensive.

It is the object of the invention to provide a simplified data transmission system.

According to the invention a data transmission system includes a digital to analogue converter arranged to provide analogue output signals representing a digital input, a transmission link for transmitting the analogue signals to a remote point, and an analogue to digital converter at the remote point for converting the transmitted analogue signals to a digital output.

Apparatus embodying the present invention will now be described, by way of example, with reference to the accompanying drawing, which shows in simplified schematic form a data transmission system.

Referring now to the drawing, a data transmitting section 1 and a receiving station 2 are linked by a normal telephone line 3. The apparatus at the transmitting and receiving stations closely resembles devices commonly known as telescriptors or telescribers. Such devices are described in detail, for example, in United States Patents Nos. 2,847,502 and 2,916,550.

At the transmitting station 1 a telescriber transmitter 4 is associated with a tablet 5 and a stylus 6. The stylus 6 is supported by pairs of pivoted arms 7 and 8 which are respectively linked to positions sensors 9 and 10. The linkage formed by the arms 7 and 8 is such that movement of the stylus 6 over the surface of the tablet 5 produces a corresponding movement of the sensors 9 and 10, the positions taken up by the sensors 9 and 10 respectively indicating the position of the stylus in analogue form along each of a pair of substantially mutually perpendicular co-ordinates. In one form of telescriber transmitter, as set forth in greater detail in the United States Patent No. 2,916,550 referred to above, the movement of the position sensors in this way produces analogue signals which are passed to the transmiter 4 to alter the frequency of an oscillator (not shown), a separate oscilaltor being provided for each of the sensors 9 and 10.

The tablet 5 is supported on a pivot (not shown) and is provided with a switch 11 which is operated whenever the stylus 6 is pressed down on the tablet. Thus the switch 11, commonly referred to as the "pen-lift" switch, provides a signal when the stylus has been lifted clear of the tablet 5 in order to indicate that any position-indicating information transmitted at this time is to be considered ineffective in controlling the receiving apparatus at the remote receiving station 2, as will be described. The switch 11 is also connected, in the transmitter 4, to vary the output frequency of a further oscillator (not shown) in known manner.

The tablet 5 also includes a pair of locating members 12 secured to its upper face which are provided to facilitate locating a document 13 in a predetermined position relative to the stylus 6.

The transmiter 4 is arranged in conventional manner described in detail, for example, in the United States Patent No. 2,916,550 previously referred to, to provide a combined output signal containing the variable frequency elements derived from the three oscilaltors associated respectively with the sensors 9 and 10 and the pen-lift switch 11. This output signal is passed over the telephone line 3 to the remote receiving station 2.

The receiving station 2 is basically similar to a receiving telescriber and includes a receiver 30 containing filters and amplifiers (not shown) which separate the components of the incoming signal from the line 3 to actuate servo motors 14 and 15 and a pen-lifter solenoid 16. The servo motors 14 and 15 are connected by means of linkage levers 17 and 18 respectively to a stylus 19 in much the same way as the stylus 6 is connected to the position sensors 9 and 10 at the transmitting station. The stylus 19 is electrically conductive and is connected by means of the linkage levers 17 and a conductor 25 to a source of electrical current (not shown).

The linkage levers 17 and 18 rest on a bar 23 which is movable in response to energisation and de-energisation of the solenoid 16 to raise or lower the stylus 19 in response to the "pen-lift" signal derived from the stylus 6 at the transmitting station 1. For recording purposes a conventional pen 24 is conveniently positioned beside the stylus 19.

The stylus 19 at the receiving station 2 is moved over the surface of a plate 20 by the action of the servo motors 14 and 15, which respond to signals derived from the composite signal applied to the line 3 so that the stylus 19 follows the movements of the stylus 6 at the transmitting station 1. The plate 20 has a number of contact bars 21/0 to 21/11 arranged on its surface. The bars 21/0 to 21/11 are conected to a utilization device 26, which may, for example, be the input store of a computer. The plate 20 also has a pair of locating members 22, similar to the members 12 at the transmitting station. Finally, in order to produce distribution signals in a manner to be described, it is preferred, although not essential, to provide the solenoid 16 with contacts (not shown) arranged to control the energisation of a uniselector 27, the bank contactst of the uniselector 27 being connected to the utilisation device 26.

The operation of the apparatus will be described. It will be assumed that the data is to be transmitted in groups, each group consisting of one, or more, decimal members. For example, in a stock control application, the group might consist of the stores number of an article, how many of that article from a stores unit (e.g. a dozen, a score, etc.) and the number of units of that article which have been issued, or received. The operator of the data transmiter 1 is provided with a format indicator which shows how the data should be entered. The format may be similar to that used on so-called mark sensing cards. An example of a mark sensing card is shown in British Patent 555,995. In the present example the format indiactor is the document 13, and as is shown, the document provides three main fields in which printed "boxes" are arranged in columns, each column containing boxes corresponding to each decimal digit value. In this case, the three fields correspond to the three items forming a group. One field, of three columns, is provided for the stores number, which has three digits, while the other two fields, of two columns each allow two-digit representations of the unit and of the quantity of units issued or received respectively.

The operator at the transmitting station is thus provided with set of areas defined by the printed boxes in which to mark the digits forming the group. Thus, in the example shown in the drawing the Stores Number is shown as being represented by a mark in the "1" digit-position in the first column, a mark in the "5" digit-position in the second column and a mark in the "7" digit-position in the third column, thus representing a value of "157" in the Stores Number field. Similarly, the "Unit" field is represented by the value "50," the stylus being shown as in position for marking the "0" digit-position of this field. The marks in the boxes are, of course, made by the stylus 6 and provide a record of the data which was actually transmitted. In order to make each mark the stylus was pressed into contact with the document by the operator, the pressure on the stylus operating the switch 11.

Thus, positioning the stylus over a particular box generates a pair of analogue signals which uniquely represent the position of that box relative to the area occupied by the entire document 13, within the accuracy of resolution of the system. The pressure of the stylus in operating the switch 11 produces a signal that signifies that the current stylus position is to be accepted as indicative of a digit value to be accepted by the computer or other utilization apparatus.

Where, for example, the data is to be transmitted to a computer, it is desirable to provide an error correction facility for use when the operator makes a mistake in entering the data. In the present case, a particular marking area represented by the boxes in the upper right hand corner of the document is reserved for error correction. If a mark is made in one of these boxes, the resultant signals transmitted to the receiver are to be interpreted by the computer as indicating that an error exists in previously transmitted data. The computer may be programmed to cancel the storage of the whole of the group currently being transmitted, or to cancel the last digit which was transmitted. For this purpose, as indicated in the present example, two boxes are provided, one signifying that only a single digit is to be cancelled, while the other signifies that the whole group is to be cancelled.

In addition two further boxes are provided in the present example to indicate whether the quantity to be registered is to be added to or subtracted from the total stock. These boxes are labelled "Credit" and "Debit" in the drawing.

As has been noted, the receiving station 2 is equipped with a receiving device closely resembling a conventional receiving telescriber, and the receiver stylus 19 is positioned under control of the transmitted signals representing the position of the transmitter stylus 6. Thus, as indicated in the drawing, when the digit value "0" is to be transmitted, the transmitter stylus 6 is positioned by the operator over a box in the 0-digit row of boxes. The document is so located by the members 12 relative to the tablet 5 that when the stylus 6 is positioned in this way the receiver stylus 19 is positioned over the contact strip 21/0. Similarly the rows of boxes corresponding to the digits 1 to 9 are so positioned on the document 13 that the receiver stylus 19 is positioned respectively over the contact strips 21/1 to 21/9 in response to the positioning of the transmitter stylus 6 over a box representing a corresponding digital value.

When the operator at the transmitting station presses the stylus 6 on to the document to make a mark in one of the boxes, the action of the switch 11 provides a signal which allows the solenoid 16 at the receiving station to move the bar 23 to allow the stylus 19 to contact the appropriate one of the contact strips 21. Thus current from the stylus 19 is delivered over a connecting line from the strip 21 to the utilization device 26. Because individual connections are provided from the strips 21 to the utilization device 26, the output from the receiver is digital in form, that is one particular connection, having digital significance, is energised according to the value of the digit transmitted. In a similar way the strips 21/10 and 21/11 are provided for control purposes and the connections from these strips are connected to the utilization device 26 to provide the requisite error indications. It will be realised that the particular manner in which the error indications are given operational significance depends upon the way that the utilization device 26 is constructed. For example, if the utilization device is a computer, it may be programmed to accept an error signal and take the appropriate action to cancel the last received digit or to cancel the entire group of values previously transmitted according to the significance given to the particular error signal received.

It will be realised that the energisation of a connection from one of the strips 21/0 to 21/9 merely indicates a digital value, without denominational or field significance. The utilization device 26 may be programmed to accept successive digits and by their sequence to allot them field or denominational significance. Alternatively, and as indicated in the drawing, such significance may also be provided by the uniselector 23. Since the uniselector 23 is stepped by signals derived from the solenoid 16, it will be appreciated that the uniselector 23 is stepped once for every digit entered, and the bank connections of the uniselector thus provide an indication of the denominational or field significance of each digit as it is entered.

It will be realised that the successive energization of the strips 21 as described is sufficient to enter the transmitted data into the utilization device. However, it is usual to provide, in order to be able subsequently to trace the history of a data transmission, a record of the transaction. For this purpose a document 28 is positioned over the plate 20 and is located by the locating members 22. The document 28 closely resembles the document 13 at the transmitting station 1, but instead of printed boxes arranged in columns, the document 28 has holes 29 similarly spaced. Thus, the stylus 19 is positioned in response to the signals transmitted from the transmitting station 1 and makes contact with the appropriate strip 21 through one of the holes 29 in the document 28. At the same time, the pen 24 makes a mark on the document 28 adjacent the hole 29 through which the stylus makes the contact.

It will be appreciated that the conversion of the analogue signals provided by the transmitter 4 to digital form by means of a servo controlled stylus such as 19 may be accomplished in other ways than that described above. For example, the plate 20 may be a plain table and the conversion arrangements may be on a separate sheet located on the table by the members 22. In this case a thin printed circuit plate which carries contact areas corresponding to the boxes of the document 13 at the transmitter may be positioned on the table. Thus, positioning the transmitter stylus 6 in a particular box will cause the receiver stylus 19 to be positioned on the corresponding contact area of the receiver plate. The stylus may then have an electrical potential applied to it. Each contact area may then have a separate output line connected to it, and the potential will appear on that particular output line which is connected to the contact area on which the stylus is resting. The output lines may be arranged in groups, each group corresponding to one decimal digit of the digits forming a data group. One output line in a group of lines will be energised at a time, indicating the value of the digit which is being received at the moment. Thus, using this form of output line arrangement, the grouping of the lines gives the digits field or denominational significance and the uniselector 23 is then unnecessary.

Alternatively, all the contact areas corresponding to the same digit value may be connected to a single output line, making ten output lines in all for a decimal system. This arrangement of output lines has the same effect as the control strip arrangement described above. The same output line will be energised repeatedly if the same digit is transmitted repeatedly, the energisation ceasing between digits as the stylus moves from one contact area to another. As before, the utilisation device may be programmed to accept each energisation as representing a single digit and to assemble the sequence of digits in store in the manner necessary to give them the desired significance, or a distributing arrangement, similar in function to the uniselector 23 may be used for this purpose. Instead of providing the document 28, a permanent record of the transmitted information may be obtained by positioning a sheet of conventional electrical recording paper over the receiver plate, the potential which is applied to the stylus 19 being sufficient to cause marking of the paper.

In a further form of construction, a sine wave signal may be applied to the stylus 19 and the position of the stylus 19 is then determined by detecting which output line carries a signal as a result of the capacitative coupling between the stylus and the contact area over which it is located. The permanent record may then be obtained by providing the stylus with a pen or other ink marking element and using untreated recording paper. Alternatively, the pressure of the stylus may be used to mark a pressure-sensitive recording paper. In a further alternative, the position of the stylus may be detected magnetically.

The preceding description has assumed that the transmitting station 1 is arranged to deal with discrete records such as the document 13. However, the usual form of telescriber has provision for feeding record paper from a roll across the writing area. The paper from the roll may be marked with boxes in the manner of so-called continuous stationery so that it is unnecessary to use only discrete documents. Alternatively, the necessary format indication for positioning the writing stylus 6 may be provided by a mask fitted over the writing area and located by the members 12 or by other devices, such as locating pins. The mask may then carry holes corresponding to the boxes shown in the drawing, the mask also being marked with printed descriptive matter to show the titles of the different recording fields, for example. In a further variation, a transparent mask may be mounted beneath the paper and illuminated from below, so that the outline of the mask and its descriptive matter are visible through the paper. It will be realised that in practice a greater number of box-positions would be provided than are shown in the drawing which is simplified for the sake of clarity.

The receiving station may similarly be arranged to use records in the form of continuous stationery instead of discrete documents such as the document 28. However, if imperforated paper is used at this station, the detection of the position of the stylus 19 will require to be by one of the methods referred to which do not require an electrical contact to be made through the paper.

Thus, a conventional telescriber installation may be arranged for the purpose of entering data into, said, a computer from a remote station by providing suitable digit-position detector arrangements at the receiving station. Such a telescriber installation is then available for use in the conventional manner to transmit information in non-digital form if this is required as well as for remote controlled input to the computer. Moreover, the installation may provide two-way transmission facilities so that the operator at the remote station may both transmit data to the computer and receive data from it.

In the transmission of data an alternative form of error correction from that described may be employed. In this case a pair of marking areas are provided for each digit position. Under normal circumstances one area of each pair is used. However, if a mistake is made, the entire data group is re-recorded, using the second areas of the pairs. The computer is programmed to cancel the storage of the data recorded in the first areas if it receives signals indicating that a second area has been marked, and to accept the markings in the second areas as the correct entry.

It will be seen, therefore, that in operating the apparatus described, data recorded in digital form are converted as the result of the movement of the transmitting stylus into analogue signals for transmission to a remote station, where, by operation of an electro-mechanical servo system, the analogue signals are converted back into discrete digital representations of the transmitted data. These digital representations are also made available as output electrical signals in a form suitable for direct entry into a utilization apparatus, such as a computer. In order that random movement of the stylus at the transmitting station is not reconstituted at the receiving station as spurious digital information, the writing tablet at the transmitting station is provided with a pressure switch so that only analogue signals representing information actually recorded at the transmitting station are reconverted back into digital form effective to be entered into the utilization device. It will be realised that other forms of switch at the transmitting station may be used instead of the tablet switch described. For example, the stylus itself may be equipped with a pressure-operated, or proximity switch. Moreover, the switch may be connected otherwise than merely to control the operation of a pen-lifting device at the receiving station. For example the switch may be employed to inhibit the transmission of the analogue signals altogether, such as by disabling the oscillators in the transmitter or by gating their outputs. This has the advantage that the receiving stylus is moved only when a recorded digit is actually transmitted and prevents any random movements of the stylus at the receiving station in the interval between the transmission of data.

What is claimed is:

1. A data transmission system including a transmitter and a receiver; said transmitter including generating means for generating a continuously variable signal; sensing means operative to continuously vary said signal in response to change in distance from a datum; and selecting means operable to indicate a selected one of a plurality of predetermined locations relative to said datum; said receiver including representing means operative in response to said continuously variable signal to represent said distance from the datum and converting means operative in resonse to the representation of said distance by said representing means to generate a further signal representing said selected location.

2. A data transmission system as claimed in claim 1 in which said transmitted includes a member movable relative to said datum; said sensing means is responsive to the distance of said member from the datum to vary the continuously variable signal; and said selecting means is operable when the member is positioned at the selected location.

3. A data transmission system as claimed in claim 2 including a mask having a separate aperture at each of the predetermined locations respectively and in which said member is engageable in the aperture at the selected location.

4. A data transmission system as claimed in claim 2 including means for supporting a record member in a predetermined position relative to said datum and in which said predetermined locations are spaced areas on said record member.

5. A data transmission system as claimed in claim 1 in which the receiver includes a follower movable relative to a second datum in response to said continuously variable signal and operative to generate said further signal representing said selected location.

6. A data transmission system as claimed in claim 1 in which the receiver includes a means to support a second record member having a separate aperture corresponding to each of said predetermined locations respectively and a follower movable over said second record member; drive means for said follower operative in response to said continuously variable signal to move said follower to a position on said second record member corresponding to the position of the member relative to the first datum.

7. A data transmission system as claimed in claim 6 including electrical contacts engageable by said follower through that one of the apertures in the second record member corresponding to the selected location in response to the indication of the selected location; engagement of said follower with one of said contacts being effective to generate an electrical signal representing said selected location.

8. A data transmission system as claimed in claim 7 in which engagement between the follower and one of said contacts completes an electrical circuit between an electrical source and said one contact.

9. A data transmission system as claimed in claim 6 including marking means carried by the follower and operative in response to the indication of the selected location to mark the second record at a position corresponding to the position of the member relative to the first datum.

References Cited

UNITED STATES PATENTS

| | | | |
|---|---|---|---|
| 407,581 | 7/1889 | Dewey | 178—87 |
| 2,916,550 | 12/1959 | Anderson et al. | 178—19 |
| 3,038,960 | 6/1962 | Adler et al. | 178—19 |
| 3,112,362 | 11/1963 | Pecker et al. | 178—18 |
| 3,304,612 | 2/1967 | Proctor et al. | 178—18 |

FOREIGN PATENTS

| | | |
|---|---|---|
| 407,119 | 3/1934 | Great Britain. |

THOMAS A. ROBINSON, Primary Examiner

U.S. Cl. X.R.

178—87